(12) United States Patent
Guarneri et al.

(10) Patent No.: US 9,239,643 B2
(45) Date of Patent: Jan. 19, 2016

(54) METHOD AND SYSTEM FOR TOUCH SHAPE RECOGNITION, RELATED SCREEN APPARATUS, AND COMPUTER PROGRAM PRODUCT

(71) Applicant: STMicroelectronics S.r.l., Agrate Brianza (IT)

(72) Inventors: Nunziata Ivana Guarneri, Caltanissetta (IT); Alessandro Capra, Gravina di Catania (IT); Sebastiano Battiato, Aci Catena (IT); Giovanni Maria Farinella, Caltanissetta (IT); Francesco Cristaldi, San Gregorio di Catania (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 111 days.

(21) Appl. No.: 14/045,905

(22) Filed: Oct. 4, 2013

(65) Prior Publication Data

US 2014/0098045 A1    Apr. 10, 2014

(30) Foreign Application Priority Data

Oct. 4, 2012  (IT) ............................... TO2012A0864

(51) Int. Cl.
*G06F 3/041*    (2006.01)

(52) U.S. Cl.
CPC .............. *G06F 3/041* (2013.01); *G06F 3/0416* (2013.01); *G06F 2203/04104* (2013.01)

(58) Field of Classification Search
CPC ...... G06F 3/041; G06F 3/0412; G06F 3/0488
USPC .......................................... 345/156, 173–174
See application file for complete search history.

(56) References Cited

U.S. PATENT DOCUMENTS 5,487,172 A *  1/1996  Hyatt ............................... 712/32
6,512,838 B1 *  1/2003  Rafii et al. .................... 382/106

(Continued)

FOREIGN PATENT DOCUMENTS

WO    2012025733    3/2012

OTHER PUBLICATIONS

Search Report for Italian patent application No. TO20120864; The Hague, Holland; Jun. 20, 2013, 2 pages.

*Primary Examiner* — Ricardo L Osorio
(74) *Attorney, Agent, or Firm* — Seed IP Law Group PLLC (57) ABSTRACT

An embodiment of a method of recognizing finger detection data in a detection data map produced by a touch screen includes converting the data from the x, y, z space into a three-descriptor space including: a first coordinate representative of the number of intensity peaks in the map, a second coordinate representative of the number of nodes (i.e., pixels) absorbed under one or more of the intensity peaks. A third coordinate may be selected as the angular coefficient or slope of a piecewise-linear approximating function passing through points having the numbers of nodes absorbed under the intensity peaks ordered in decreasing order over said intensity peaks, which permits singling out finger data with respect to non-finger data over the whole of the touch screen. The third coordinate may be also selected as an adjacency value representative of the extent the intensity peaks are adjacent to one another, which permits singling out finger data produced over a portion of the touch screen with respect to non-finger data produced over another portion of the touch screen.

12 Claims, 8 Drawing Sheets

(56) References Cited

U.S. PATENT DOCUMENTS

| | | | |
|---|---|---|---|
| 2007/0268275 A1* | 11/2007 | Westerman et al. | 345/173 |
| 2008/0073525 A1* | 3/2008 | Gross et al. | 250/307 |
| 2008/0158175 A1* | 7/2008 | Hotelling et al. | 345/173 |
| 2008/0158178 A1* | 7/2008 | Hotelling et al. | 345/173 |
| 2008/0158185 A1 | 7/2008 | Westerman | |
| 2009/0095540 A1 | 4/2009 | Zachut et al. | |
| 2009/0262073 A1 | 10/2009 | Rigazio et al. | |
| 2009/0284495 A1 | 11/2009 | Geaghan et al. | |
| 2011/0025629 A1* | 2/2011 | Grivna et al. | 345/173 |
| 2011/0316767 A1 | 12/2011 | Avrahami | |
| 2014/0055364 A1* | 2/2014 | Sze et al. | 345/169 |
| 2014/0098058 A1* | 4/2014 | Baharav et al. | 345/174 |
| 2014/0160064 A1* | 6/2014 | Yairi et al. | 345/174 |

* cited by examiner

METHOD AND SYSTEM FOR TOUCH SHAPE RECOGNITION, RELATED SCREEN APPARATUS, AND COMPUTER PROGRAM PRODUCT

PRIORITY CLAIM

The instant application claims priority to Italian Patent Application No. TO2012A000864, filed Oct. 4, 2012, which application is incorporated herein by reference in its entirety.

TECHNICAL FIELD

This disclosure relates to finger sensing, e.g., in touch screens.

Various embodiments may relate to multi-touch shape recognition in touch-screen apparatuses.

SUMMARY

A wide range of applications of touch screens involve finger-sensing technology: smart phones, tablet computers, navigators, interactive display devices of various kinds, control panels, and remote controls of various types are exemplary of such applications.

With the growing diffusion of consumer devices involving the use of touch screens, procedures capable of discriminating against other types of shapes and the shapes of one or more fingers play an increasing role.

These procedures may be functional, e.g., in discriminating unintentional touch or contact with the screen, which could undesirably activate specific functions. It is noted that in various sensing technologies, a finger that is approaching a touch screen may activate touch functionalities even before touching the screen.

Recognizing the presence and number of fingers which are simultaneously touching a screen is thus of interest for many types of applications, such as, e.g., those based on multi-finger tracking (zooming, swipe, figure rotation, gaming, finger painting, etc.).

Certain embodiments may relate to a corresponding system, a related touch-screen apparatus, as well as a related computer-program product, loadable in the memory of at least one computer device and including software code portions for performing the steps of a method of embodiments when the product is run on such a device. As used herein, reference to such a computer-program product is intended to be equivalent to reference to a computer-readable medium containing instructions for controlling an electronic device to coordinate the performance of a method of an embodiment. Reference to "at least one computer" is intended to highlight the possibility for certain embodiments to be implemented in a distributed/modular fashion.

In various embodiments, detection of multi-finger touches involves a supervised classification system.

In various embodiments, a touch map may be represented by three descriptors invariant to translation and rotation.

In various embodiments, multi-touch shape discrimination may be based on a classification system able to discriminate the touch(es) of one or more fingers against non-finger touches.

In various embodiments, finger classes may be defined involving touch shapes of one to ten fingers (i.e., two hands). Various embodiments can be theoretically extended to the detection of any number of fingers.

Various embodiments may also detect fingers that are very close to one another.

In various embodiments, non-finger classes may be defined involving, e.g., ear, half-ear, half-cheek, and cheek classes. In various embodiments, other non-finger classes may be defined.

In various embodiments, the setting of the procedure may be adapted to different screen sizes.

In various embodiments, detection of multi-finger touches may be used for different applications since, once plural touches are detected, then each peak in multi-finger tracking may become representative of a finger to track.

BRIEF DESCRIPTION OF THE DRAWINGS

Various embodiments will now be described, by way of example only, with reference to the annexed figures, wherein.

DETAILED DESCRIPTION

Illustrated in the following description are various specific details aimed at an in-depth understanding of various exemplary embodiments. The embodiments may be obtained without one or more specific details, or through other methods, components, materials etc. In other cases, known structures, materials or operations are not shown or described in detail to avoid obscuring the various aspects of the embodiments. Reference to "an embodiment" in this description indicates that a particular configuration, structure, or characteristic described regarding the embodiment is included in at least one embodiment. Hence, expressions such as "in an embodiment", possibly present in various parts of this description do not necessarily refer to the same embodiment. Furthermore, particular configurations, structures, or characteristics may be combined in any suitable manner in one or more embodiments.

References herein are used for facilitating the understanding of the reader and thus they do not define the scope of protection or the range of the embodiments.

Various embodiments considered herein may detect and reject unintentional "touches" on a touch screen. Various embodiments may adopt different touch-screen sensing technologies as known in the art.

FIGS. 1A to 1E are thus schematically representative of various touch maps as currently obtained from a touch screen by any known means depending on the touch-screen technology.

Although a flat screen S will be at least implicitly assumed throughout this detailed description of exemplary embodiments, those of skill in the art will promptly appreciate that the disclosure may also apply to non-flat screens. Consequently, although a flat screen S will be considered for exemplary purposes herein, various embodiments may also apply to non-flat screens.

Also, following the phraseology prevailing in this technical domain, a "touch" screen and a "touch" map or shape will be referred to throughout the instant detailed description of exemplary embodiments; in various sensing technologies (for instance in the case of mutual sensing technology with a high gain level) an object that is approaching a touch screen may activate touch functionalities even before actually touching the screen; various embodiments may thus extend also to objects, e.g., one or more fingers, not actually touching the screen but rather "hovering" at a small distance from the screen. Consequently, the "touch" maps or shapes as considered herein will be generally intended to be representative of maps or shapes produced by an object such as a finger interacting with a touch screen even in the possible absence of direct "physical" contact.

Figure 1A:
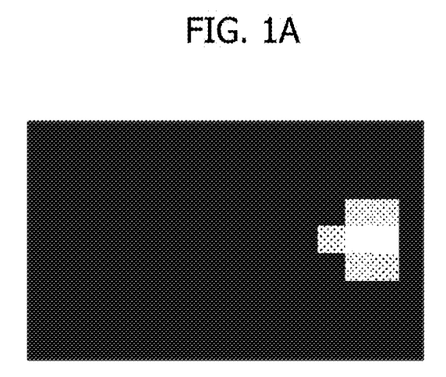
FIGS. 1A to 1E are exemplary of various touch screen maps, according to embodiments.
Figure 1B:
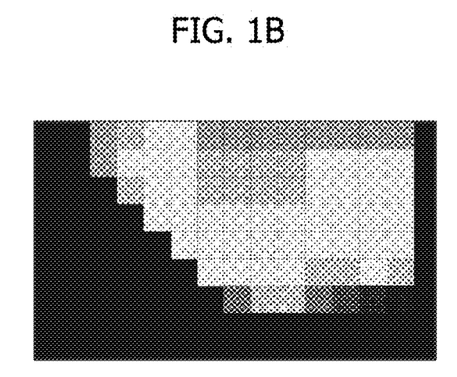
Figure 1C:
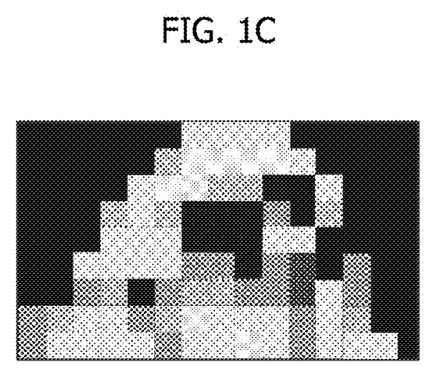
Figure 1D:
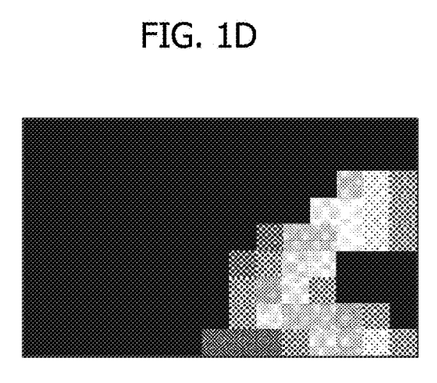
Figure 1E:
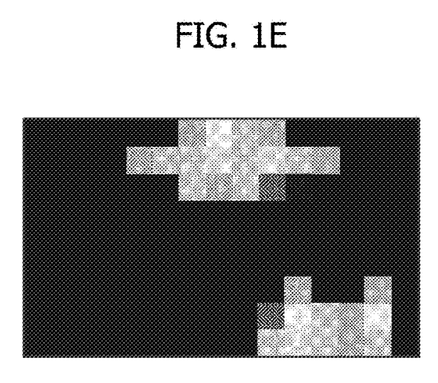

FIGS. 1A to 1E are schematically representative of various maps produced on a touch screen by interaction with:

a finger (FIG. 1A);
a cheek (FIG. 1B);
an ear (FIG. 1C);
a half cheek or ear (FIG. 1D);
plural fingers (FIG. 1E).

As used herein, a "finger" map will be one produced by one or more fingers (separated from one another or touching one another). FIGS. 1A and 1E are thus exemplary of such finger maps.

As used herein, a "non-finger" map will be one produced, e.g., by a cheek, an ear, a half cheek, or half ear. FIGS. 1B, 1C, and 1D are thus exemplary of such non-finger maps.

Various embodiments may operate on raw map data captured by using any known touch-screen board, possibly equipped with a controller. The STMT05 S-Touch® Finger-Tip Multi-touch controller and a 4" touch-capacitive display may be exemplary of a system adapted to process such map data.

In various embodiments, such data may be processed in a classification system of the supervised classifier type.

In various embodiments, such classification system may involve a training step or phase adapted to be performed off-line and a testing step or phase adapted to be performed in a continuous mode.

In various embodiments the data in the detection data map of the screen are arranged in a x, y, z space; in such a space a pixel (or "node", according to the prevailing vocabulary of touch-screen technology, which may be adopted also in the annexed claims) having coordinates x, y in the map has associated a detection-intensity value z. In various embodiments, the value z may be representative of the touch data or the touch-panel electrical response, e.g., being proportional to the intensity of touch or (inversely) proportional to the distance of a finger/object from the screen plane.

Various embodiments may involve a transformation from the original x, y, z space to a new three-descriptor space for classification purposes.

Figure 2:
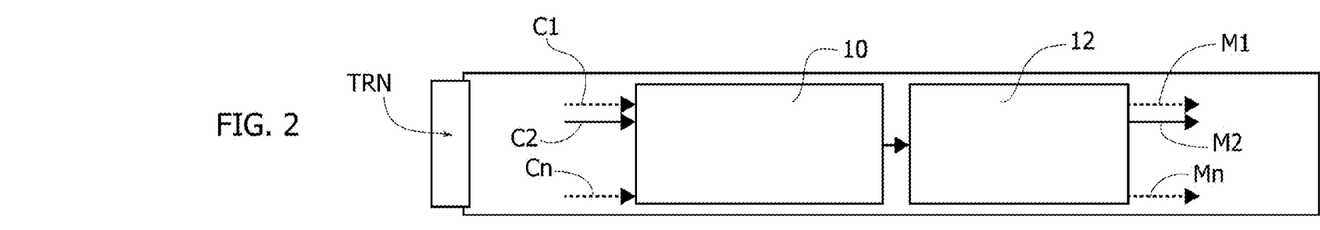
FIGS. 2 to 6 are functional block diagrams of exemplary processing, according to embodiments.

For instance, in various embodiments, as schematically represented in FIG. 2, in a training phase TRN, in a step 10 a complete map dataset C1, C2, . . . , Cn (that is Class 1, Class 2, . . . , Class n) is transformed from the original space (x, y, z) to a three-descriptor space. In a step 12, for each class a parameter-set model M1, M2, . . . , $M_n$ (that is Model 1, Model 2, . . . , Model n) is extracted. In various embodiments, a fitting method based on a Gaussian Mixture or GM may be used for that purpose, i.e., computing for each class the parameter set of the GM model that better fits the training data.

Various embodiments may adopt a type of classifier different from a classifier based on GM.

Figure 3:
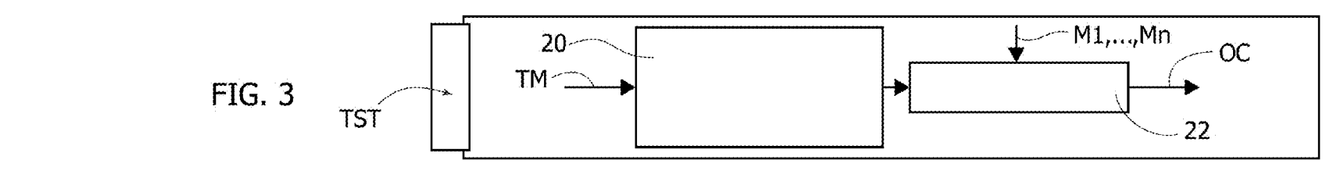

In various embodiments, as schematically represented in FIG. 3, a test phase TST may have a test map TM as an input. In a step 20 that map is transformed from the original space (x, y, z) to a three-descriptor space.

In a step 22, the models, i.e., M1, M2, . . . , $M_n$ are used to compute a log likelihood between the three descriptors representing the input test map TM, and all class models.

In various embodiments, the classification may be performed by computing the maximum of log-likelihood values to generate an output class OC.

In various embodiments, a dataset of touch maps may be collected for each class. As further detailed in the following, each map of datasets may be processed in order to extract three features which define a new map representation in the space of descriptors.

Figure 4:
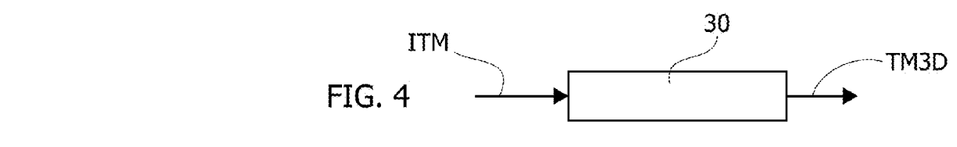

As schematically represented in FIG. 4, in various embodiments, an input map ITM in the space (x, y, z) in the form of a N×M matrix of pixels, e.g., capacitive nodes, may undergo a space transformation 30 (which per se may be representative of either of the transformation 10 and 20 of FIGS. 2 and 3) through the extraction of three descriptors as better detailed in the following.

After the transformation, the map, designated TM3D, may be represented in a new 3-descriptor space by a point having three coordinates in such a space, namely Descriptor1, Descriptor2, Descriptor3.

Figure 5:
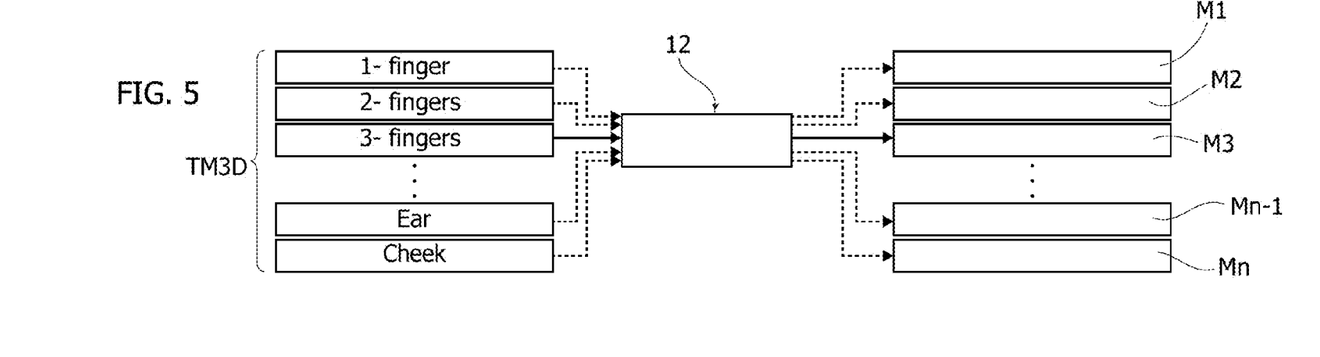

As schematically represented in FIG. 5—and as will become clearer on the basis of the description of the transformation from the (x, y, z) space to the 3-descriptor space provided in the following—the "transformed" map TM3D may be regarded as including a plurality of class datasets (1-finger, 2-fingers, 3-fingers, . . . , ear, cheek, and so on) represented in the new 3-descriptor space.

In various embodiments, each of these datasets (each representative of a type of touch/interaction with the screen, see, e.g., FIGS. 1A to 1E) may be separately processed by a fitting method (e.g., based on GM) as schematically represented by block 12 in order to extract a respective set of model parameters M1 (e.g., parameters of a 1-finger dataset model), M2 (e.g., parameters of a 2-finger dataset model), M3 (e.g., parameters of a 3-finger dataset model), . . . , $M_{n-1}$ (e.g., parameters of an ear dataset model), and $M_n$ (e.g., parameters of a cheek dataset model).

Figure 6:
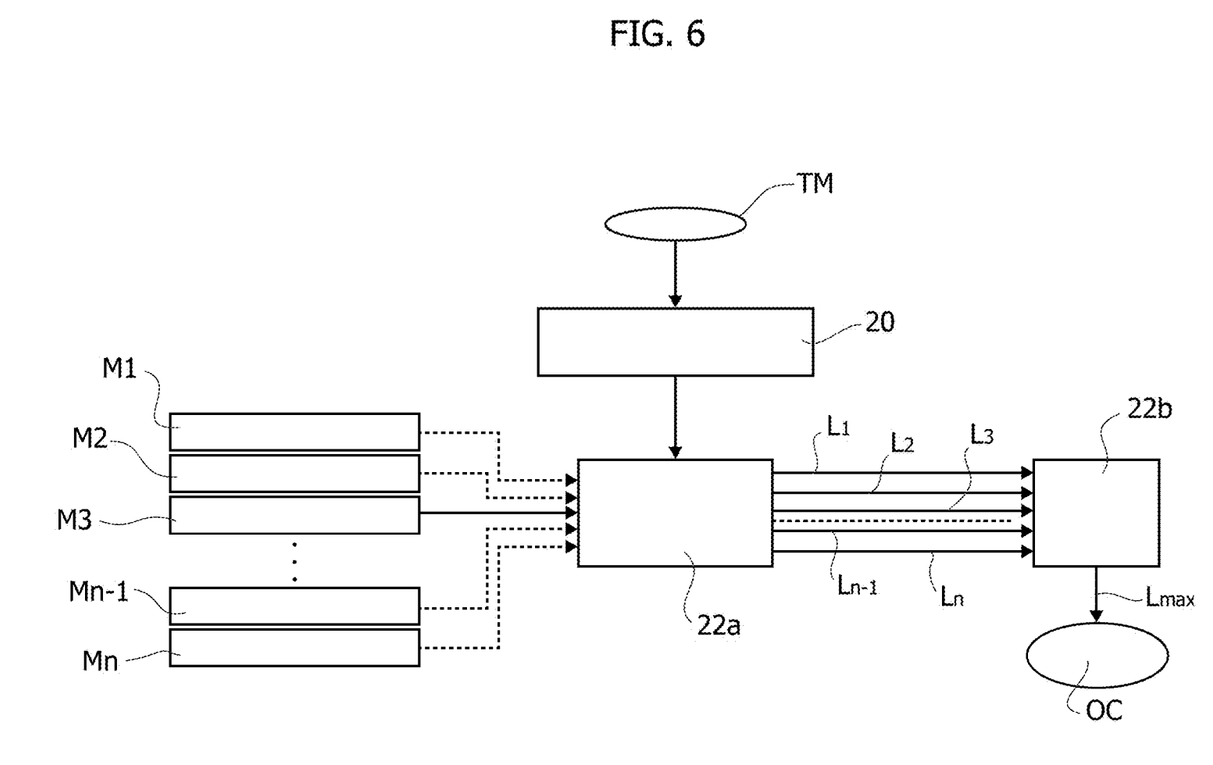

In various embodiments as schematically represented in FIG. 6, the test map TM of FIG. 3 may be similarly transformed into a 3-descriptor space in the step 20 and classified as belonging to a class through the maximum log likelihood estimation with the 3-descriptor models M1, M2, M3, . . . , $M_{n-1}$, $M_n$ extracted in the training phase TRN.

In various embodiments, Log Likelihood processing 22 may include:

a first step 22a devoted to generating respective Log Likelihood values L1, L2, L3, . . . , $L_{n-1}$, $L_n$ each relative to a likelihood test (i.e., $L_j$=Likelihood Test/$M_j$ with j=1, . . . , n), and a second step 22b, devoted to selecting, out of the values L1, L2, L3, . . . , $L_{n-1}$, $L_n$, a maximum likelihood result $L_{max}$, which provides the classification result OC, i.e., the input test belongs to the class model which yields $L_{max}$.

In various embodiments, the transformation (generally indicated 30 in FIG. 4) may involve three descriptors for representing an input map ITM in the x, y, z space which are invariant to rotation and translation.

Exemplary of embodiments of such three descriptors may be:

the total number of local peaks;
the maximum of Absorbed Pixel values (APs);
a differential or "delta" value, which is a function of the APs.

In various embodiments, these descriptors may be extracted in a transformation module 30 by means of a function as exemplified in the following which detects local peaks in the input N×M map in the x, y, z space and the number of nodes (i.e., pixels) which lie under each peak bell (named Absorbed Pixel—AP).

Figure 7:
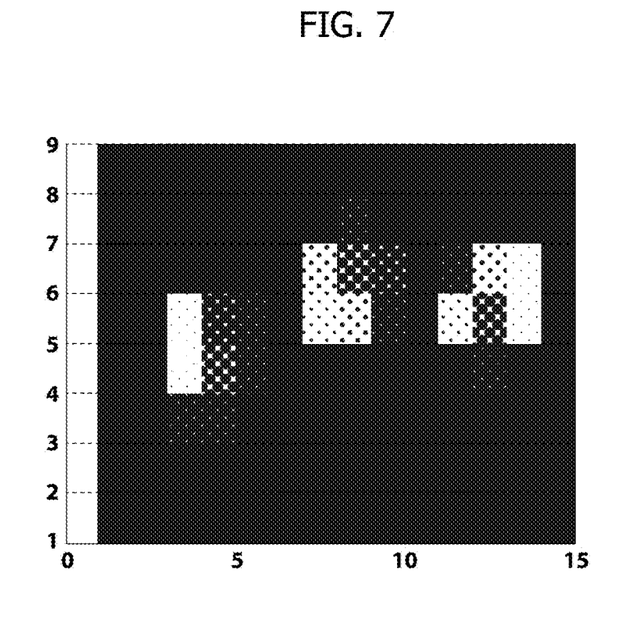
FIGS. 7, 8 and 9 are exemplary of the results of processing, according to embodiments.

FIG. 7 herein is a simplified exemplary representation of a 2D input map as provided by a touch-screen representation.

Figure 8:
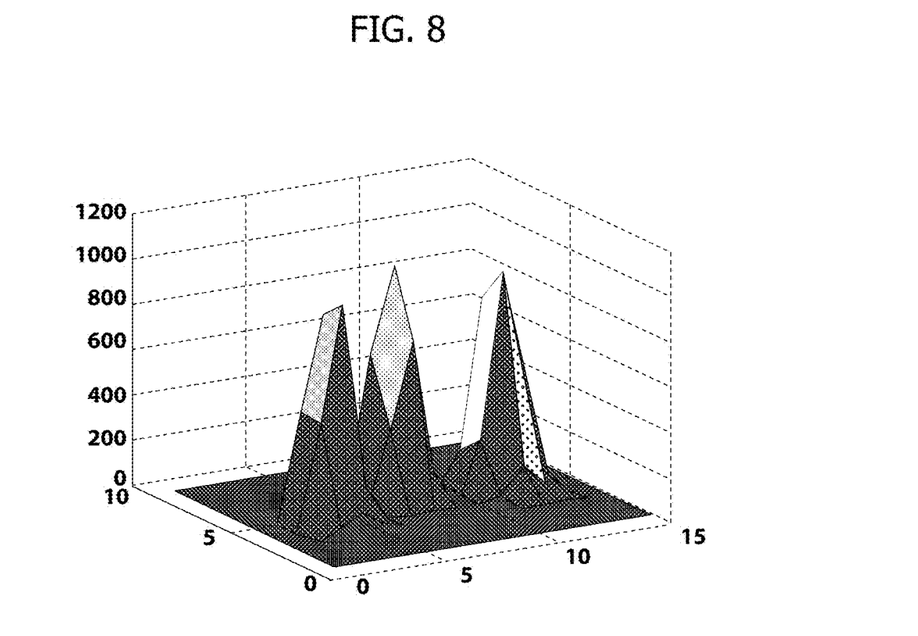

FIG. 8 herein is a corresponding simplified 3D representation of N×M points of the space (x, y, z), wherein the intensity P(x, y) of the sensing signal at a generic point of the sensing screen having (arbitrary) coordinates x, y is plotted as the third coordinate, namely z.

Figures 9, 10:
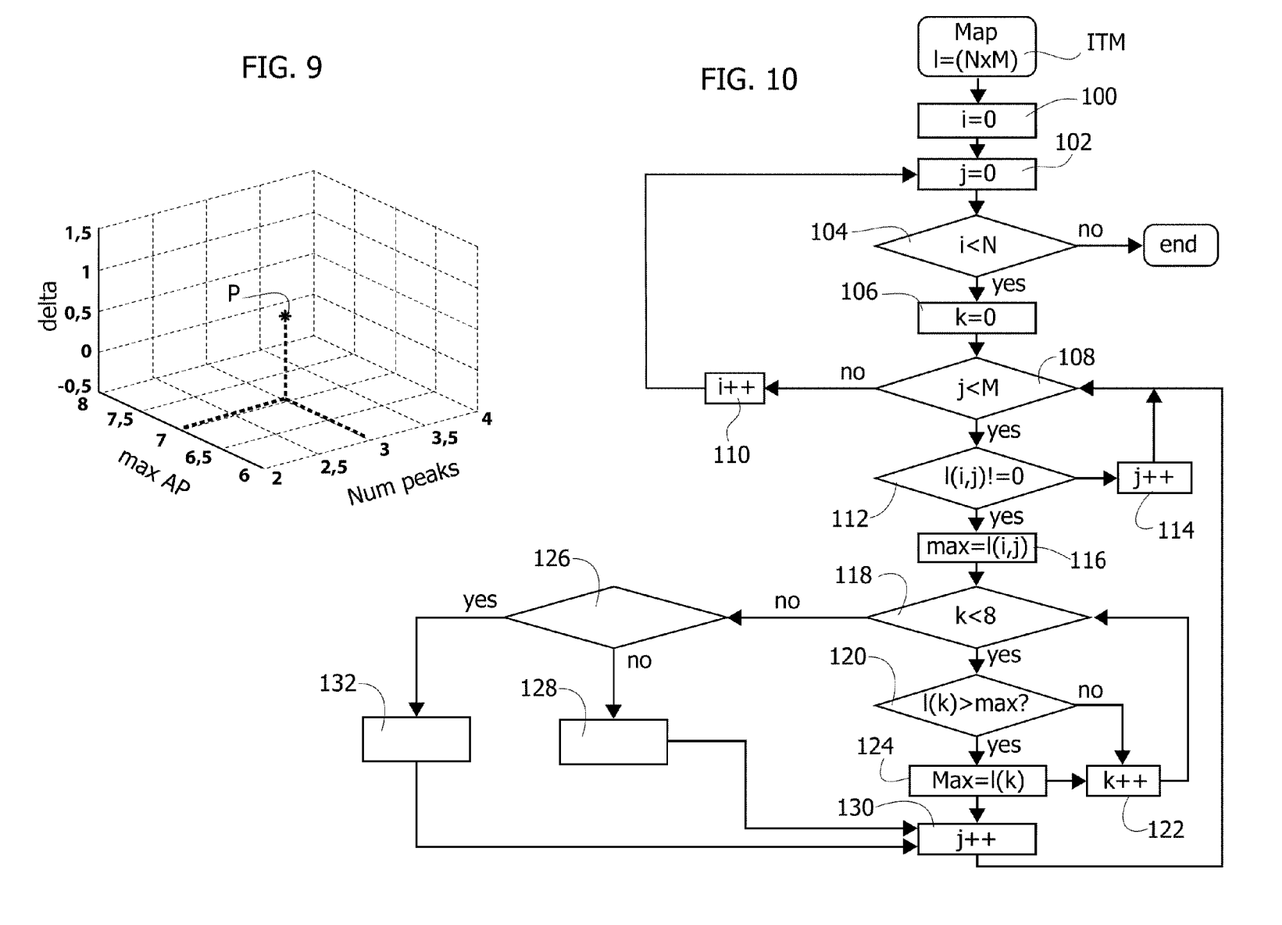
FIG. 10 is a flow chart of exemplary processing, according to embodiments.

FIG. 9 herein is exemplary of the possibility of transforming ("mapping") the representation of FIGS. 7 and 8 into a 3-descriptor representation wherein the input map ITM is transformed into a (single) point P in the 3-descriptors space (Peaks, maxAP, Delta), having, e.g., the following exemplary coordinates:

Peaks=3;
maxAP=max (7, 6, 6)=7;
Delta=0.5.

FIG. 10 is a flowchart of an exemplary routine adapted to operate on input map I (N×M) in the x, y, z space and perform the two following processing steps:

i)—identifying the number of local peaks $P_k$ numPeaks, this being the first descriptor), with k=1, . . . , $W_{peaks}$;

ii)—identifying the number of pixels/nodes absorbed relative to each peak $AP_{Pk}$.

FIG. 10 is a flowchart of an exemplary procedure to extract from a map the local peaks and, for each peak, the number (and coordinates) of the pixels/nodes lying under that peak.

The number of peaks extracted may be used as a first descriptor. Subsequently the values for $AP_{Pk}$ may be ordered (in any known manner) in a decreasing order, the maximum value (the first in the list) may be selected as a second descriptor (maxAP).

A third descriptor (Delta) may then be computed as:

$$Delta=f(AP_{Pk})=(\Sigma(AP(k)-AP(k+1))/(W-1)$$

where the summation extends over k=1, . . . , W−1 and W is the number of peaks extracted in the input map ITM.

Stated otherwise, the number of pixels/nodes absorbed $AP_{Pk}$ relative to each peak k (with k varying over the range 1 to W) may be regarded as the number of pixels lying under the "bell" of the k-th peak, while maxAP is the maximum value among all $AP_{Pk}$'s The "physical" meaning of the parameter Delta may be at least approximately understood by considering that the ordered values of $AP_{Pk}$'s may be plotted as a function against a notional coordinate.

Such a function is adapted to be approximated by a piecewise-linear function, namely a function made up of subsequent linear (i.e., straight) portions, each having a respective angular coefficient (slope).

The parameter Delta may thus be regarded as representative of the (average, i.e., mean) value of the angular coefficients of the various portions of such an approximating function.

In the exemplary flowchart of FIG. 10, which refers to the exemplary case of processing an input map ITM in the form of an N×M matrix in the x, y, z space:

steps 100 to 114 are representative of iteration over the indexes i (up to N) and j (up to M) with i and j gradually increased (i++, step 110; j++, step 114) with k initially set to 0 (step 106) and a check made in a step 112 as to whether the matrix element I(i, j) considered is equal to zero (in module);

whenever the matrix element I(i, j) considered is different from zero (step 112=yes), in the place of updating the index j in the step 114, the system evolves to a step 116 wherein the maximum value is initialized;

as long as the index K is lower than an upper limit (e.g., K<8) which is checked in a step 118, in a step 120 a check is made as to whether the current node value I(k) is higher than the maximum value; in the negative (i.e., 120=no) the index K is increased in a step 122 and the system returns to the step 118; in the case of a positive outcome of the step 120 (i.e., step 120=yes), the step 122 is preceded by a step 124 where the maximum value is updated;

whenever the step 118 reveals that the index K has reached its upper limit (e.g., 8; step 118=no) in a step 126 a check is made as to whether the (local) maximum thus located has already been stored in the list of local maxima; in the negative (step 126=no) in a step 128 the coordinates of the local maximum in question are stored and the index j is increased in a step 130 to return to the step 108;

if the step 126 reveals that the maximum located has already been stored in the list of local maxima (step 126=yes), then the list of AP by their maxima is updated in a step 132 and the system returns to the step 130 to increase the index j and return to the step 108.

The procedure just exemplified may be ended when the step 104 reveals that the index i has reached its upper value N.

At that point, two data for the input map ITM are available:

the number $P_k$ of local peaks, i.e., numPeaks corresponds to the cumulative number of peaks whose coordinates have been subsequently stored in the step 128;

the number of $AP_{Pk}$, i.e., the number of pixels/nodes absorbed relative to each peak, which may be derived from the updated list(s) of the step 132.

As indicated, in an exemplary three descriptor space:

a first descriptor may be the number of local peaks, a second descriptor may be computed as the maxAP i.e., the maximum (the first element) of the list arranged in decreasing order of all $AP_{Pk}$, a third descriptor may be the Delta value which is computed as the (average/mean) slope (i.e., average or mean value of the angular coefficients of the piecewise-linear approximating function of the sequence of the AP values ordered in a decreasing order (see, e.g., the formula introduced in the foregoing).

For instance, in various embodiments, a value for Delta may be computed based on the criteria exemplified in the following.

i) The values of $AP_{Pk}$, as derived, e.g., from the procedure exemplified in the flowchart of FIG. 10, are sorted in descending order starting from the maximum value (MV1=maxAP). Stated otherwise, the APs may thus be represented on a Cartesian coordinate system x, y where each point will have coordinates x, y, with the maximum value MV1 represented as having coordinates (1, MV1). The second highest value MV2 will have coordinates (2, MV2), the third (3, MV3), and so on.

ii) The values/points thus ordered in an ordered decreasing series of values may then be joined in the x, y plane to produce a piecewise-linear approximating curve, including a first (straight) portion joining MV1 and MV2, a second portion connecting MV2 with MV3, a third portion connecting MV3 with MV4, and so on. Each one of these straight portions will have a respective angular coefficient: for instance the straight portion joining MV1 and MV2 will have an angular coefficient identified by the difference between MV1 and MV2 (e.g., (MV1−MV2)/(1−2)=−(MV2−MV1)).

iii) The descriptor Delta may then be computed as the average/mean value of the angular coefficients of the various portions constituting the piecewise-linear function, namely as (Σ(AP(k)−AP(k+1))/(W−1)

In brief, in various embodiments, a value for Delta may be computed by:
  ordering the numbers of nodes absorbed under the intensity peaks as an ordered decreasing series,
  approximating the ordered decreasing series thus formed with a piecewise-linear approximating function including a plurality of linear portions having respective angular coefficients, and
  determining the angular coefficient (Delta) as the average value of the respective angular coefficients of the portions of the piecewise-linear approximating function.

In various embodiments, processing as exemplified above may discriminate two different objects having similar 2D-shapes.

Figure 11:
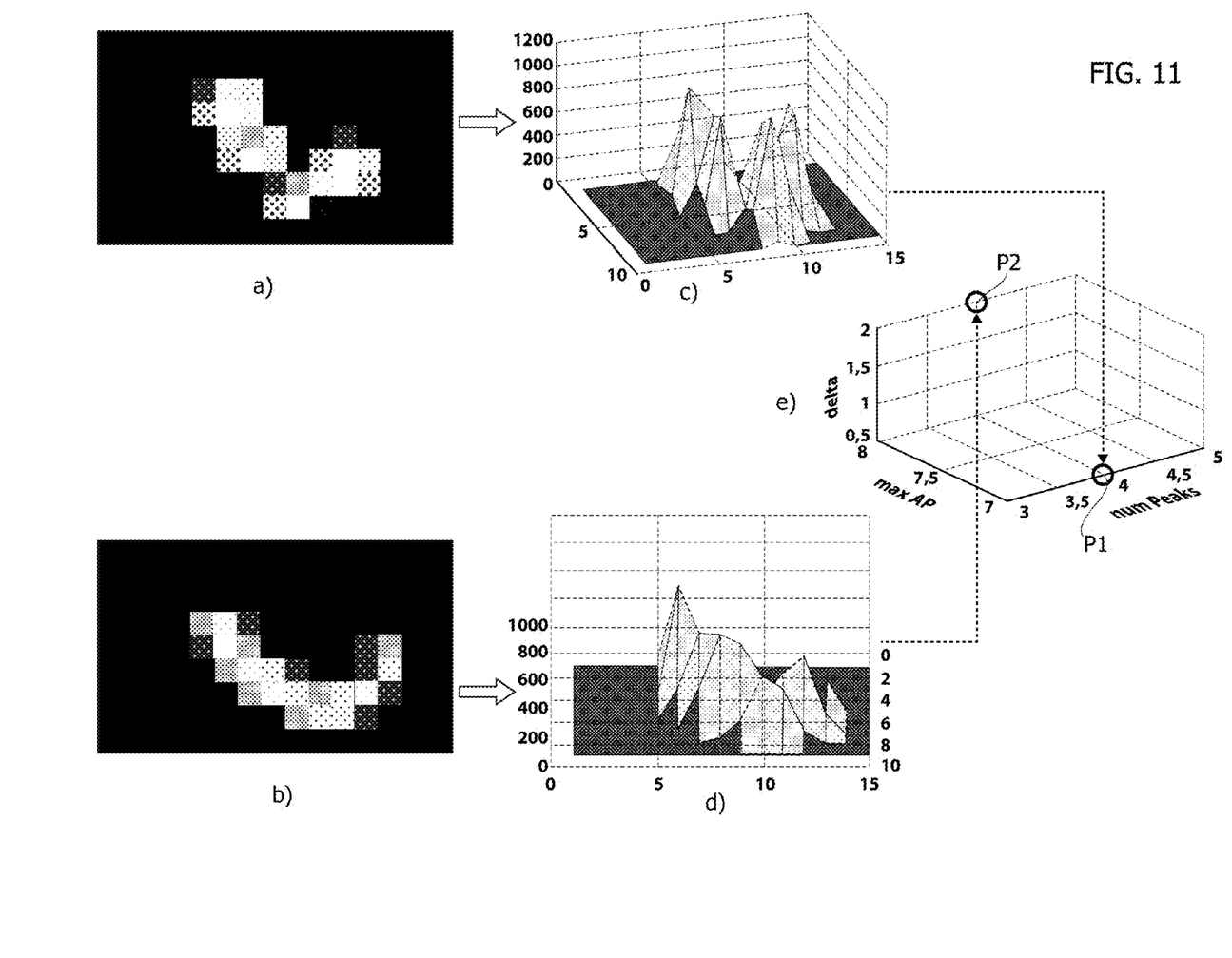
FIG. 11, including portions designated a) to e) is a representation by way of synopsis of embodiments.

For instance, FIG. 11 describes the exemplary case of two maps produced by:
  four fingers located near one another in an arched pattern (FIG. 11a),
  an ear (FIG. 11b).

While the corresponding 3D representations in the space (x, y, z), i.e., the plots of the intensity/strength of the sensing signal plotted as the third coordinate, namely z, may appear somewhat similar (see FIG. 11c—four fingers, and FIG. 11d—ear), the representation in the numPeaks, maxAP, Delta space may yield two quite different points P1, P2, respectively.

As exemplified, these may possibly have more or less the same numPeaks coordinate (i.e., 4, which is more or less what FIGS. 11c and 11d may show), but exhibit quite different values for maxAP (e.g., 7 and 8, respectively) and Delta (e.g., 0.5 and 2, respectively).

The foregoing provides a good example of how mapping to the (numPeaks, maxAP, Delta) space makes it possible to clearly distinguish, i.e., separate, each finger(s) class (both for training and for testing purposes, see FIGS. 2 and 3) over any other classes, including e.g., ear, cheek, half-ear/half-cheek in the space of these three descriptors.

Tests performed have confirmed this for 1800 exemplary maps for each of eight classes, i.e., 1-finger to 5-fingers plus ear, half-ear/half-cheek (HEHC) and cheek, with training and testing involving capturing 14,400 samples balanced for each class.

In various embodiments, this may apply to shapes that otherwise, e.g., by relying just on the area or the contour shape in the (x, y, z) space, may appear to be very similar, the shapes of FIGS. 11a and 11b (four fingers and an ear, respectively) being exemplary of a case in point.

Various embodiments may well "resolve" these cases since the descriptors considered may be robust to finger detection, while prone to reject other shapes. Various embodiments may detect even a relatively high number of adjacent fingers interacting with the screen, however rotated and positioned.

Especially when operating with larger screens (7" and over), situations may arise where the screen, while being touched with one or more fingers, may be also touched—possibly inadvertently—by e.g., the palm of the hand.

Being able to recognize/discriminate a palm touching the display screen when using fingers may be helpful. This may be the case, for example, when the palm of one hand may touch the display while two fingers are being used to effect zooming.

Various embodiments as exemplified in the foregoing, and applying three descriptors (e.g., numPeaks, maxAP, Delta) over a map related to the whole screen may attempt to give only one shape in output for each touch frame in input. For instance, various embodiments as exemplified in the foregoing may yield as a result a "non-finger" shape if, while being acted upon by one or more fingers, the screen is (e.g., inadvertently) touched with a palm.

Various embodiments herein may deal also with such a contingency by considering various shapes on the screen separately.

Various embodiments, which may be suitable for use, e.g., in touch microcontrollers for 7" and over 7" display screens, may be adapted to detect (multi-) finger touch and palm touch by distinguishing the two, being thus able to discriminate them and single out finger touch.

Various embodiments may be based on map data analysis being no longer a global (i.e., whole screen) analysis, but a local analysis.

In various embodiments, local analysis may be based on considering each peak with its absorbed pixels as a "blob", with each blob adapted to be regarded either as isolated from or adjacent (contiguous) to other blobs.

For instance, in various embodiments, when scanning an input map, e.g., from left to right and from top to bottom, one may detect (based on the same approach exemplified in the foregoing):
  a number of local peaks Pk, and
  an absorbed number of pixels APs relative to each peak ($AP_{Pk}$).

In various embodiments, each peak, with its APs, may be regarded as constituting a blob, and, in various embodiments possible adjacencies between blobs can be checked, for instance by forming a square symmetric matrix of adjacencies of dimensions, e.g., N×N, wherein rows and columns may represent peaks, and the element (x,y) in the matrix may store a value representative of adjacency between the blob containing the peak x and the blob containing the peak y.

In various embodiments, by reading the data in the touch map, matrix objects (simple or complex) may be identified, each object being represented by a group of three descriptors invariant to rotation and translation, namely:
  number of peaks;
  absorbed pixel value (i.e., the total number of absorbed pixels under all peaks);
  adjacency values.

In various embodiments, each touch shape may be distinguished by using the list of the peaks and their APs values.

Figure 12:
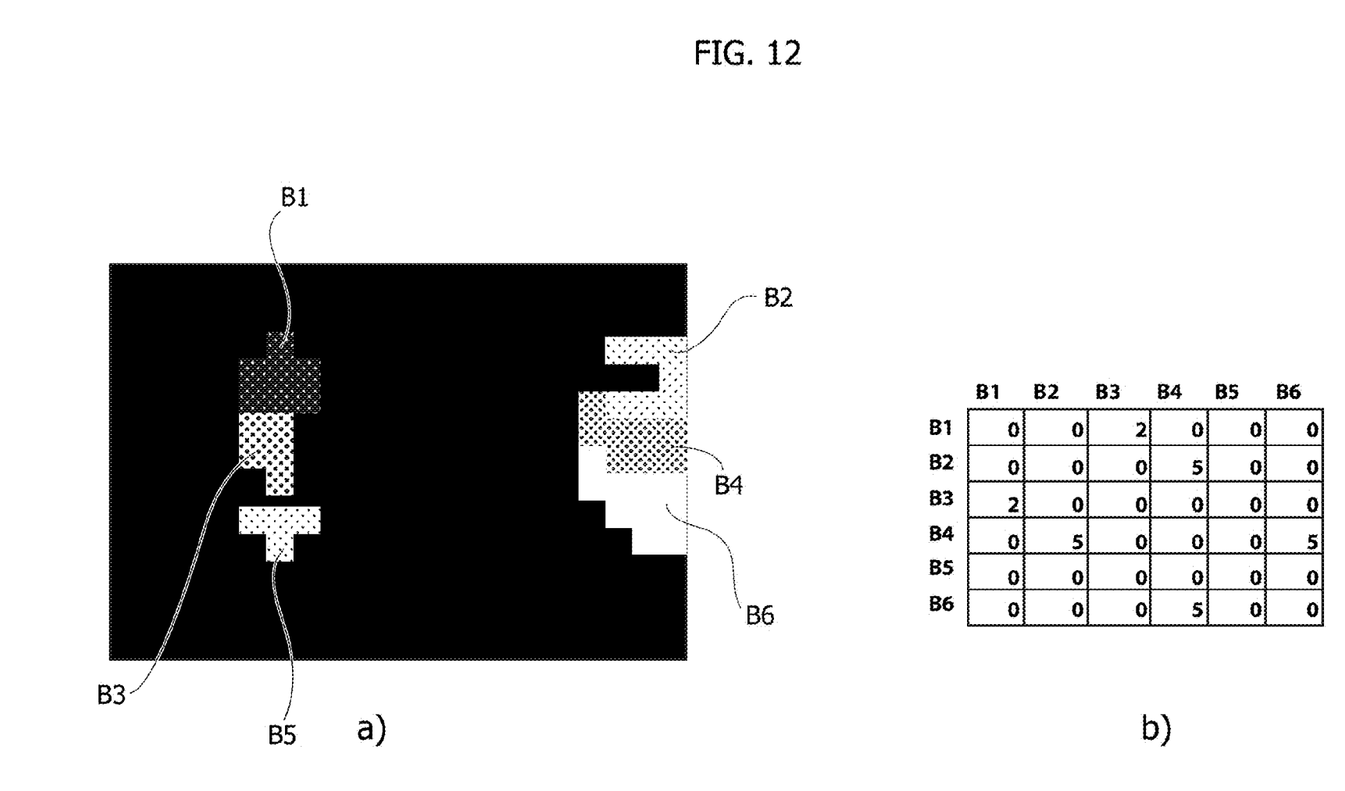
FIG. 12, which includes two portions designated a) and b), as well as FIGS. 13 and 14, are exemplary of embodiments.

FIG. 12 is exemplary of such an approach. In part a) of FIG. 12 a number of touch shapes are illustrated as blobs, with each blob having a different label value, i.e.:
  B1, B3 possibly representative of (i.e., candidate to representing) two nearby fingers touching a portion of a screen,
  B5 possibly representative of one isolated finger touching the screen, and
  B2, B4, B6 possibly representative of a palm touching another portion of the screen.

Part b) of FIG. 12 schematically depicts an exemplary adjacency matrix for these blobs B1 to B6. In various embodiments, a matrix may be constructed according to a metric where adjacency is, e.g., zero for two blobs that are not adjacent (e.g., B1 and B2) and take increasing values for adjacent blobs as a function of the extent (e.g., the number of pixels) over which the blobs are adjacent, i.e., contiguous or in touch with each other (e.g., 2 for B1 and B3 and 5 for B2 and B4 and B4 and B6).

In various embodiments, the matrix of adjacencies may allow verifying if a shape is isolated (single) or complex (composed). The exemplary matrix of adjacencies considered herein is symmetric, so that processing for extracting composed blobs may be limited to the upper diagonal values.

The map of the exemplary case of FIG. 12 a) thus includes 6 "micro" blobs B1 to B6 and four touches/objects, namely:
two fingers that are contiguous i.e., touching each other (i.e., B1 and B3),
one isolated finger (i.e., B5), and
a palm (i.e., B2, B4 and B6).

The "micro" blobs B1 and B3 are adjacent, so they may be regarded as constituting a complex (composed) "macro" blob.

The micro blob B5 is isolated from the others, i.e., has no adjacency to any other blobs.

The micro blobs B2, B4 and B6, being adjacent, constitute a complex macro blob.

In various embodiments, each blob (simple or composed) may thus be allotted an adjacency value, e.g.:
B1+B3→adjacency value=2
B2+B4+B6→adjacency value=10
B5→adjacencies value=0

Adjacency values as exemplified in the foregoing may be allotted, e.g., by allotting to blob B5 (which is isolated from the others, with no adjacency, that is with zero adjacency) a value equal to zero, and by allotting to the other blobs adjacency values which are a function (e.g., the sum) of the number of contiguous pixels/nodes in the adjacent blobs.

In various embodiments, each object in the map may thus be recognized as belonging to one of the two types: simple and complex (or composed).

A simple object may be made up of one peak and may be represented by the number of pixels lying under the bell of the peak (Absorbed Pixels value). In various embodiments, it may be represented by a value of adjacency equal to zero, as it is isolated—i.e., not adjacent—with any other object.

A complex/composed object may include more than one peak and the APs of the object correspond to the sum of the singular APs belonging to the peaks composing the object.

In various embodiments, the third coordinate of the three descriptor space may thus be selected as the adjacency value representative of the extent said intensity peaks in the map are adjacent to one another.

In various embodiments, the second coordinate (AP) may thus be selected as either of the number of nodes absorbed under an isolated intensity peak (e.g., B5) or as the sum of the numbers of nodes absorbed under a plurality of adjacent intensity peaks (e.g., B1, B3 or B2, B4, B6).

It will be appreciated that a single blob (with no adjacencies) may not be necessarily representative of a finger; in fact it may also represent a palm, with e.g.:
a first coordinate numPeaks=1 peak,
a second coordinate AP (number of nodes underlying the peak) with a value (much) higher than the typical values of AP for a finger,
a third coordinate (adjacency)=0.

In such a case, the palm may be recognized over a finger primarily on the basis of the second coordinate.

Figure 13:
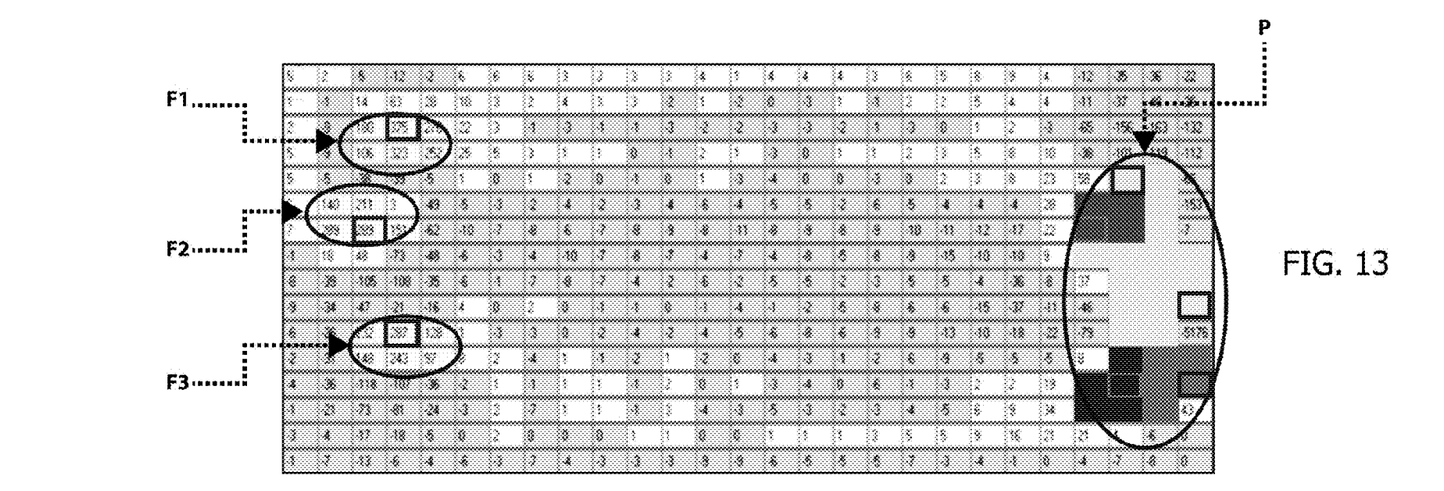
Figure 14:
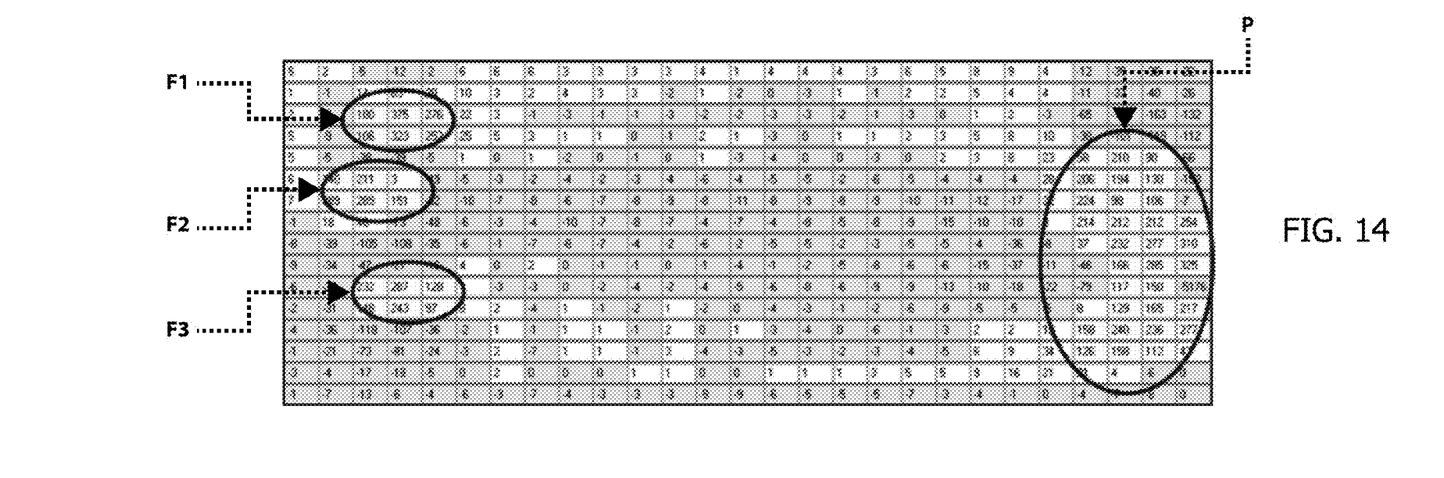

In various embodiments, an exemplary raw data set as represented in FIGS. 13 and 14 may be processed on the basis of the principles outlined above to produce the following output:
three separated fingers F1, F2, F3
a palm P.

While in terms of apparent shape in the (x, y, z) space—i.e., area and contour on the screen plane—three fingers touching a screen close to each other may be very similar to a palm, a system according to various embodiments may be able to identify as its final output three touching fingers in portion of a screen, irrespective of the possible presence of a palm touching another portion of the screen.

In various embodiments, this may involve distinguishing, in the data converted from the x, y, z space into the three-descriptor space:
simple objects (e.g., B5 of FIG. 12) having a first coordinate representative of a single intensity peak and a third coordinate representative of the absence of adjacent peaks,
composed objects (e.g., B1, B3 or B2, B4, B6 of FIG. 12) having a first coordinate representative of plural intensity peaks and a third coordinate representative of the presence of adjacent peaks.

Tests performed have confirmed reliability of operation over 300 maps for each class in the space of the three exemplary descriptors considered, demonstrating that even with only three descriptors the finger class may be well separated from other classes (e.g., palm).

Again, while reference has been previously made to a fusion matrix obtained by using a classifier based on a Gaussian mixture or GM, in various embodiments other types of classifiers (e.g., a simple decision tree) may be used while retaining the capability of discriminating finger touches from, e.g., palms.

Such an apparatus for identifying objects contact, on in the vicinity of, a touch screen may be disposed partially or totally on one or more integrated circuits, and may include, or may be coupled to, the touch screen. Furthermore, the system may perform functions, including functions described herein, in software, firmware, hardware, or in a combination or sub-combination of software, hardware, and firmware.

Without prejudice to the underlying principles of the disclosure, the details and embodiments may thus vary, even appreciably, with respect to what has been described herein by way of non-limiting example only, without departing from the extent of protection of the disclosure.

From the foregoing it will be appreciated that, although specific embodiments have been described herein for purposes of illustration, various modifications may be made without deviating from the spirit and scope of the disclosure. Furthermore, where an alternative is disclosed for a particular embodiment, this alternative may also apply to other embodiments even if not specifically stated.

The invention claimed is:

1. A method, comprising:
recognizing finger detection data in a detection data map produced by a touch screen, wherein the data are arranged in an (x, y, z) space associating a node having coordinates (x, y) in the data map and a detection intensity value z, the recognizing including,
converting the data from the (x, y, z) space into a three-descriptor space having three coordinates including,
a first coordinate representative of the number of intensity peaks in the map,
a second coordinate representative of the number of nodes absorbed under the intensity peaks, and
a third coordinate selected as either,
an angular coefficient of an approximating line passing through points representative of the numbers of nodes absorbed under the intensity peaks ordered in decreasing order, and
an adjacency value representative of the extent the intensity peaks are adjacent to one another.

2. The method of claim 1, further comprising selecting the third coordinate as the angular coefficient, and at least one of:
   selecting the second coordinate as the maximum of the numbers of nodes absorbed under the intensity peaks,
   singling out, in the data converted from the (x, y, z) space into the three-descriptor space, finger data with respect to non-finger data over the whole of the touch screen.

3. The method of claim 2, wherein determining the angular coefficient comprises:
   ordering the number of nodes absorbed under the intensity peaks as an ordered decreasing series,
   approximating the ordered decreasing series with a piece-wise-linear approximating function including a plurality of linear portions having respective angular coefficients, and
   determining the angular coefficient as the average value of the respective angular coefficients.

4. The method of claim 1, further comprising selecting the third coordinate as the adjacency value representative of the extent the intensity peaks are adjacent to one another, and at least one of:
   selecting the second coordinate as either of the number of nodes absorbed under an isolated intensity peak or the sum of the numbers of nodes absorbed under a plurality of adjacent intensity peaks,
   singling out, in the data converted from the (x, y, z) space into the three-descriptor space, finger data produced over a portion of the touch screen with respect to non-finger data produced over another portion of the touch screen.

5. The method of claim 4, further comprising distinguishing, in the data converted from the (x, y, z) space into the three-descriptor space:
   simple objects having a first coordinate representative of a single intensity peak and a third coordinate representative of the absence of adjacent peaks, and
   composed objects having a first coordinate representative of plural intensity peaks and a third coordinate representative the presence of adjacent peaks.

6. The method of claim 5, further comprising determining the third coordinate by:
   identifying for the intensity peaks in the detection data map respective sets of nodes absorbed thereunder, whereby each intensity peak and the respective set of absorbed nodes forms a blob,
   locating adjacent nodes between the blobs thus formed,
   determining adjacency values for the blobs as a function of the number of adjacent nodes thus located.

7. The method of claim 6, further comprising at least one of:
   setting to zero the adjacency value for an isolated blob having no adjacent nodes with other blobs,
   setting the adjacency value for a plurality of adjacent blobs as the sum of the numbers of adjacent nodes in the adjacent blobs.

8. The method of claim 7, further comprising:
   converting from the (x, y, z) space into the three-descriptor space a detection data map produced by a touch screen; and
   subjecting the detection data map converted from the (x, y, z) space into the three-descriptor space to a likelihood test with a plurality of test models including models of finger detection data to be recognized as produced in a training phase including conversion from the (x, y, z) space into the three-descriptor space.

9. The method of claim 8, wherein the training phase includes obtaining the test models via fitting through a Gaussian Mixture fitting to model data maps.

10. The method of claim 9, wherein, in the training phase, the fitting follows conversion from the (x, y, z) space into the three-descriptor space.

11. The method of claim 10, wherein the likelihood test comprises a Log-Likelihood test.

12. The method of any of claim 11, wherein the likelihood test comprises:
   a plurality of individual tests each resulting in a respective likelihood value with a respective one of the test models;
   a maximum likelihood check of the likelihood values resulting from the plurality of individual tests for identifying the one of the individual tests yielding the maximum likelihood value, whereby the test model producing the maximum likelihood value is held to be representative of the data in the detection data map produced by the touch screen.

* * * * *

UNITED STATES PATENT AND TRADEMARK OFFICE
CERTIFICATE OF CORRECTION

PATENT NO.        : 9,239,643 B2
APPLICATION NO.   : 14/045905
DATED             : January 19, 2016
INVENTOR(S)       : Nunziata Ivana Guarneri et al.

It is certified that error appears in the above-identified patent and that said Letters Patent is hereby corrected as shown below:

In the Claims

Column 11, Line 10:
"ordering the number of nodes absorbed under the intensity" should read, --ordering the numbers of nodes absorbed under the intensity--.

Signed and Sealed this
Nineteenth Day of July, 2016

Michelle K. Lee
*Director of the United States Patent and Trademark Office*